VARIABLE SPEED POWER TRANSMISSION MECHANISMS

Original Filed June 16, 1958

United States Patent Office

Re. 25,907
Reissued Nov. 16, 1965

25,907
VARIABLE SPEED POWER TRANSMISSION MECHANISMS

Axel C. Wickman, 69 S. Washington Drive, St. Armand's Key, Sarasota, Fla.

Original No. 2,981,063, dated Apr. 25, 1961, Ser. No. 742,176, June 16, 1958. Application for reissue Aug. 24, 1964, Ser. No. 403,423
Claims priority, application Great Britain June 17, 1957
3 Claims. (Cl. 60—39.16)

Figure 1:
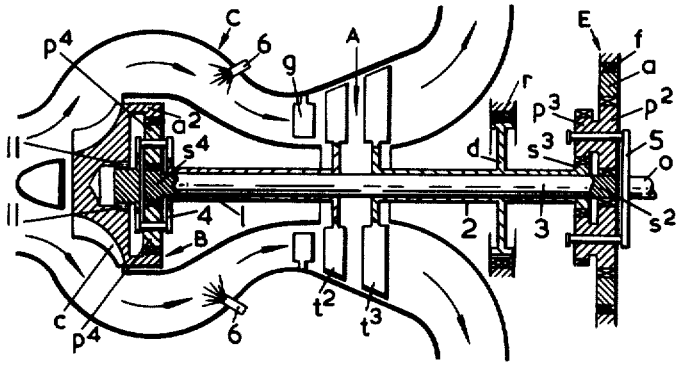

Matter enclosed in heavy brackets [ ] appears in the original patent but forms no part of this reissue specification; matter printed in italics indicates the additions made by reissue.

This invention has for its primary object to provide in a simple and convenient form automatically variable power transmission mechanisms for use with road or other vehicles.

In its broadest aspect the invention comprises in combination a gas turbine having at least two independently rotatable rotors arranged in series, an output shaft, a rotary air compressor, a combustion chamber from which motive gas is supplied to the [turbine] *rotors* under the action of the air compressor, *an* [a first] epicyclic *reduction gearing* [mechanism] connecting [at least] one of the [turbine] rotors to *drive* the output shaft, [and] a second epicyclic *gearing comprising a power input member, a power output member, and a reaction member, said second epicyclic gearing arranged for the power output member to be driven in the same direction as the power input member but at a higher speed when the reaction member is rotatively stationary, said second epicyclic gearing arranged for the power output member to be driven in the same direction as the power input member and at the same speed when the reaction member is rotating in the same direction as the power input member and at the same speed, said power input member arranged to be driven by* [mechanism connecting the air compressor to] another of the [turbine] rotors, *said power output member arranged to drive the air compressor, and* the [second epicyclic mechanism having a] reaction member connected to *drive* the *output shaft through the* [first] epicyclic *reduction gearing* [mechanism].

Further objects and advantages of the invention will be apparent from the following detailed description and annexed drawings.

Figure 2:
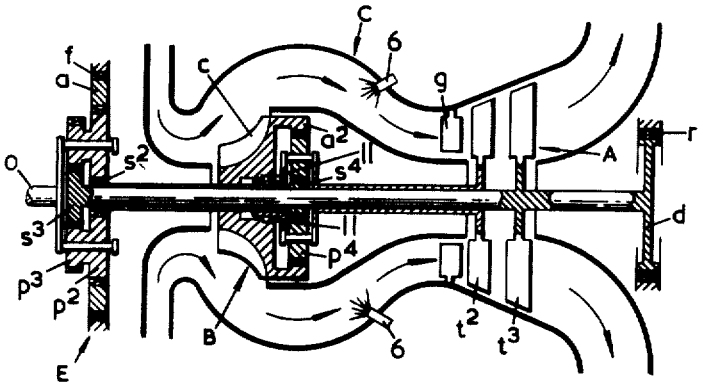

In the drawings:

FIGURE 1 is a diagrammatic showing of an embodiment of the invention, and FIGURE 2 diagrammatically illustrates a variation of the arrangement shown in FIGURE 1.

Referring to FIGURE 1, the legend A denotes generally a gas turbine, and B a rotary air compressor under the action of which motive gas is supplied to the turbine from a combustion chamber C.

The turbine A is provided with two adjacent rotors t2 and t3, and [a] guide vane*s* or blade*s* g [is] *are* located between the rotor t2 and the combustion chamber C, the latter being provided with fuel injection nozzles 6. Also, the compressor B has combined therewith an epicyclic overdrive mechanism comprising a sun pinion s4 on a shaft 3, planet pinions p4 engaging the sun pinion and mounted on a carrier 4 connected to the turbine rotor t2 by a sleeve 1 on the shaft, and an internally toothed annulus a2 engaging the planet pinions and formed on or secured to the compressor rotor c. The sun pinion s4 of the epicyclic overdrive mechanism is connected by the shaft 3 to a sun pinion s2 of another epicyclic mechanism E, and the turbine rotor t3 is connected by a second sleeve 2 on the shaft 3 to another sun pinion s3 of the last mentioned epicyclic mechanism, the sun pinion s3 being of larger diameter than the sun pinion s2. The epicyclic mechanism E includes one or more pairs of interconnected planet pinions p2 and p3 of different diameters which respectively engage the sun pinions s2 and s3, and which are mounted on a carrier 5 connected to a power output shaft o.

The larger planet pinions p2 engage an internally toothed annulus a which is normally held against rotation by a band-type friction brake f. On the sleeve 2 interconnecting the rotor t3 and the sun pinion s3 is formed or secured a brake disc d which can be held against rotation by a band-type friction brake r.

For forward drive of the vehicle, the annulus a is held by the brake f with the brake r in its released condition, and for reverse drive of the vehicle, the brake f is released and the disc d is held by the brake r.

When the fuel control valve (not shown) of the combustion chamber is opened the turbine rotor t2 rapidly accelerates the compressor B through the associated epicyclic overdrive mechanism, and as the reaction member, that is the sun pinion s4, of this epicyclic mechanism is connected to the output shaft o through the other epicyclic mechanism E, the reaction torque created by rotation of the compressor immediately accelerates the vehicle, *the epicyclic mechanism E serving as a reduction gearing.* Moreover, under idling conditions the compressor is kept at a higher speed than the turbine rotor t2.

[When the speed of the rotor t3 equals that of the rotor t2, the output shaft o is driven at the same speed.]

Essentially, the embodiment shown in FIGURE 2 is similar to that shown in FIGURE 1 and differs mainly in that the compressor is located between the *reduction* epicyclic mechanism E and the turbine rotors t2 and t3. In operation this embodiment is similar to that shown in FIGURE 1.

In each of the embodiments shown the turbine rotor t2 is connected to the compressor rotor c through a unidirectional clutch u [so that when] *which prevents the compressor rotor c from rotating slower than the turbine rotor t2. When* the vehicle overruns the engine, that is, when the vehicle drives the output shaft o, the compressor B and the turbine rotor t2 are driven at the same speed due to the unidirectional clutch *u*.

From the foregoing description, it will be appreciated that in each embodiment, the turbine includes at least two rotors arranged in series with no guide vanes arranged between adjacent rotors so that there is *a* free gas communication between the adjacent rotors. By virtue of the operative connections between the turbine rotors and the epicyclic mechanisms, there is provided a stepless gear ratio between the turbine and the output shaft.

The invention is not, however, restricted to the examples above described, as it may be embodied in other equivalent forms.

Having thus described my invention what I claim as new and desire to secure by Letters Patent is:

1. An automatically variable power transmission mechanism comprising in combination, a gas turbine having at least two independently rotatable rotors arranged in series, an output shaft, a rotary air compressor, a combustion chamber from which motive gas is supplied to the [turbine] *rotors* under the action of the air compressor, *an* [a first] epicyclic [mechanism] *reduction gearing* connecting [at least] one of the [turbine] rotors to *drive* the output shaft, [and] a second epicyclic *gearing comprising a power input member, a power output member, and a reaction member, said second epicyclic gearing arranged for the power output member to be driven in the same direction as the power input member but at a higher speed when the reaction member is rotatively stationary, said second epicyclic gearing arranged for the power output*

*member to be driven in the same direction as the power input member and at the same speed when the reaction member is rotating in the same direction as the power input member and at the same speed, said power input member arranged to be driven by* [overdrive mechanism connecting] another of the [turbine] rotors , *said power output member arranged* to *drive* the air compressor, [the second epicyclic mechanism having a] *and the* reaction member connected to *drive* the *output shaft through the* [first] epicyclic *reduction gearing* [mechanism].

2. A mechanism as claimed in claim 1, in which a sun pinion forming a part of the [first] epicyclic [mechanism] *reduction gearing* is connected to *be driven by* another sun pinion forming the reaction member of the second epicyclic *gearing* [mechanism].

3. An automatically variable power transmission mechanism comprising in combination, a gas turbine having [at least] two independently rotatable rotors arranged in series, a rotary air compressor, a combustion chamber from which motive gas is supplied to the [turbine] *rotors* under the action of the air compressor, an output shaft, [an] *a first* epicyclic *gearing comprising a power input member, a power output member, and a reaction sun pinion, said first epicyclic gearing arranged for the power output member to be driven in the same direction as the power input member but at a higher speed when the reaction sun pinion is rotatively stationary, said first epicyclic gearing arranged for the power output member to be driven in the same direction as the power input member and at the same speed when the reaction sun pinion is rotating in the same direction as the power input member and at the same speed, said power input member arranged to be driven by* [overdrive mechanism and a unidirectional clutch connecting] one of the [turbine] rotors , *said power output member arranged to drive* the air compressor, *a unidirectional clutch arranged to prevent the air compressor from rotating faster than said one rotor,* [and another] *a second* epicyclic [mechanism] *reduction gearing* for transmitting [motion] *drive* from the other of [the turbine] *said* rotors to the output shaft and including at least two sun pinions of different diameters one of which is connected to [another] *be driven by said reaction* sun pinion [forming a part of the first mentioned epicyclic overdrive mechanism] and the other of which is connected to *be driven by* the *said other* [last mentioned] rotor [of the turbine], a planet pinion carrier *rotatively fast with* [on] the output shaft, planet pinions of different diameters mounted on the carrier and engaging the associated sun pinions, a brake-controlled internally toothed annulus engaging the planet pinions of larger diameter, and a reversing brake associated with [one of] the *larger* [last mentioned] sun *pinion* [pinions].

References Cited by the Examiner

The following references, cited by the Examiner, are of record in the patented file of this patent or the original patent.

UNITED STATES PATENTS

| | | | |
|---|---|---|---|
| 2,149,785 | 3/1939 | Neugebauer. | |
| 2,472,878 | 6/1949 | Baumann. | |
| 2,702,985 | 3/1955 | Howell. | |
| 2,852,912 | 9/1958 | Kelley | 60—39.16 |

FOREIGN PATENTS

| | | |
|---|---|---|
| 759,606 | 10/1956 | Great Britain. |

OTHER REFERENCES

Hutchinson: "The Differential Gas Turbine," paper presented at the S.A.E. Golden Anniversary Meeting, St. Louis, Missouri, Oct. 31–Nov. 2, 1955, Paper No. 618.

JULIUS E. WEST, *Primary Examiner.*

SAMUEL LEVINE, *Examiner.*

MARK NEWMAN, *Assistant Examiner.*